(12) United States Patent
Irgens et al.

(10) Patent No.: US 6,865,914 B2
(45) Date of Patent: Mar. 15, 2005

(54) THREADED MEMBER LOCK

(75) Inventors: Christopher R. Irgens, Elm Grove, WI (US); John Zapushek, Racine, WI (US)

(73) Assignee: Master Lock Company, Milwaukee, WI (US)

(*) Notice: Subject to any disclaimer, the term of this patent is extended or adjusted under 35 U.S.C. 154(b) by 0 days.

(21) Appl. No.: 10/197,732

(22) Filed: Jul. 18, 2002

(65) Prior Publication Data

US 2003/0019258 A1 Jan. 30, 2003

Related U.S. Application Data

(60) Provisional application No. 60/306,345, filed on Jul. 18, 2001.

(51) Int. Cl.[7] ............................................. F16B 41/00
(52) U.S. Cl. .......................... 70/231; 70/14; 70/230; 70/232
(58) Field of Search ................... 70/14, 229–232, 70/416, DIG. 57; 411/389

(56) References Cited

U.S. PATENT DOCUMENTS

| | | | | | |
|---|---|---|---|---|---|
| 3,586,284 A | * | 6/1971 | Riebold | ................... | 248/316.1 |
| 4,441,344 A | * | 4/1984 | Kurpershoek | ................ | 70/231 |
| 4,557,458 A | * | 12/1985 | Vahlberg et al. | ............ | 248/553 |
| 4,848,112 A | * | 7/1989 | Graber et al. | ................. | 70/231 |
| 4,862,716 A | * | 9/1989 | Derman | ........................ | 70/166 |
| 4,959,979 A | * | 10/1990 | Filipow et al. | ................ | 70/58 |
| 5,097,686 A | * | 3/1992 | Plumer | ......................... | 70/232 |
| 5,388,434 A | * | 2/1995 | Kalis | ............................. | 70/232 |
| 5,722,275 A | * | 3/1998 | Price et al. | ............... | 70/379 R |
| 5,794,463 A | * | 8/1998 | McDaid | ......................... | 70/18 |
| 5,806,354 A | * | 9/1998 | Hasnik | ......................... | 70/237 |
| 6,196,781 B1 | * | 3/2001 | Yang | ........................... | 411/384 |

FOREIGN PATENT DOCUMENTS

GB          2073298 A   * 10/1981   ........... E05B/65/00

* cited by examiner

Primary Examiner—Anthony Knight
Assistant Examiner—Christopher Boswell
(74) Attorney, Agent, or Firm—Calfee, Halter & Griswold LLP (57) ABSTRACT

A lock including a lock body, lock cylinder, a threaded member and an engagement member. The engagement member moves within the lock body to engage the threaded member in at least two different positions. One of the positions allows the lock threaded member to be tightened onto a corresponding threaded connection and then locked into place, thereby securing the object which contains the threaded connection. Another one of the positions allows the lock threaded to be loosened from the corresponding threaded connection and thereby allows the lock to be removed from the object which contains the threaded connection.

26 Claims, 10 Drawing Sheets

THREADED MEMBER LOCK

CROSS-REFERENCE TO RELATED APPLICATIONS

This invention claims priority to U.S. Provisional patent application Ser. No. 60/306,345, filed Jul. 18, 2001.

FIELD OF THE INVENTION

The invention relates to a lock that is used with a threaded hole or a threaded stud member, and more specifically to a lock incorporating an engagement member that interacts with a threaded member that can receive, or be received by, another threaded member to secure the lock.

BACKGROUND OF THE INVENTION

Many items are held together or held in place by threaded members, such as bolts, nuts and screws. These threaded members provide structure and stability, but do not prohibit theft of the object as the bolt or screw can be easily removed. While conventional methods exist for securing such threaded members, including, for example, use of locking nuts, such conventional methods do not provide for easy locking and unlocking of the object to allow for removal, maintenance, replacement or selective access.

Therefore, it is desirable to provide a lock that can be adapted to fit a wide variety of objects that contain, or can be adapted to contain, either a threaded hole or a threaded stud member and thereby prevent theft, unauthorized use, or both. It is further desirable to provide a lock that can be universally adapted to secure either male or female threaded members of various sizes.

SUMMARY OF THE INVENTION

A lock for securing objects including a threaded member is provided. The lock includes a lock housing, a lock cylinder, a locking threaded member and an engagement member. The lock is in an unlocked position when the engagement member engages the locking threaded member and is in a locked position when the engagement member disengages the locking threaded member. In another embodiment, the lock is a locked position when the engagement member allows the locking threaded member to be tightened and in an unlocked position when the engagement member allows the locking threaded member to be loosened.

The locking threaded member may be either a threaded nut or a threaded stud, and may include an adapter to convert from a threaded nut to a threaded stud or to convert to another size. In one embodiment, the engagement member is a ratchet pawl. In another embodiment the engagement member is a locking lever.

Another aspect of the present invention is a method of locking an object which includes a threaded member.

BRIEF DESCRIPTION OF THE DRAWINGS

The threaded member lock of the present invention may be more readily understood by reference to the following drawings. While certain embodiments are shown as illustrative examples of the tool lock, the scope of this application should not be construed as limited to these illustrative examples.

DETAILED DESCRIPTION OF THE INVENTION

The present invention is a lock, generally referenced as 10, including a lock body 20, a lock cylinder 30, an engagement member 40, and a threaded member 50, such as a threaded nut 50a or a threaded stud 50b. The lock body 20 contains the lock cylinder 30, engagement member 40, and at least a portion of the threaded member 50, and is secured against the surface of the object which the lock 10 is applied.

Figures 17, 18A:
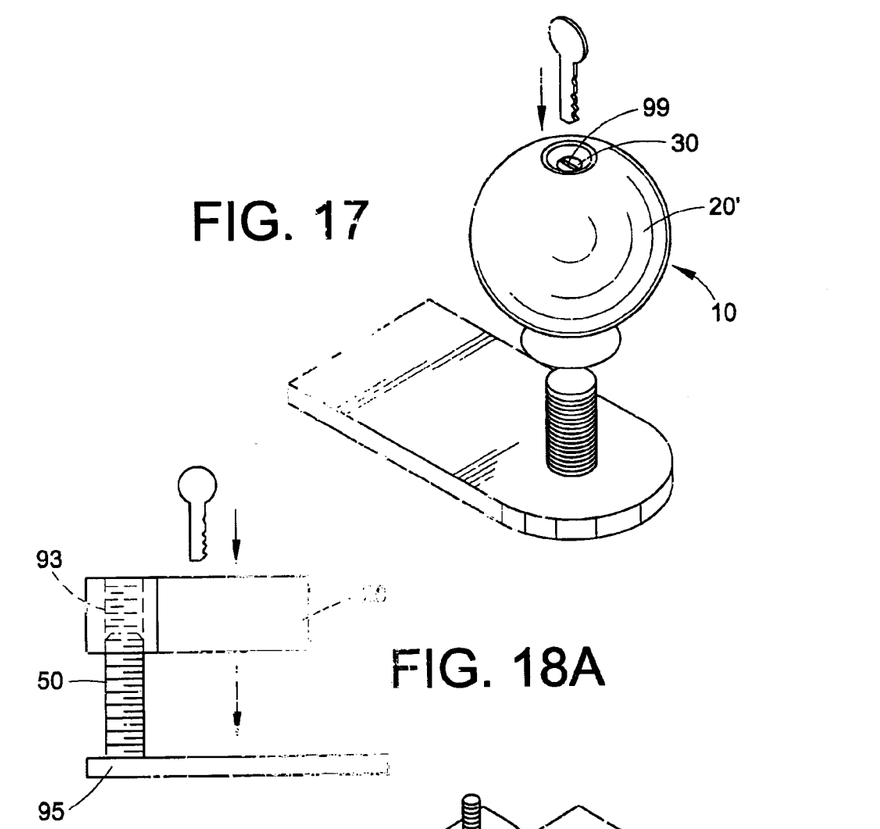
FIG. 17 illustrates an embodiment of a threaded member lock with a spherical lock body.
FIGS. 18A–C illustrate an embodiment of a threaded member lock incorporating a clap assembly.
Figure 20:
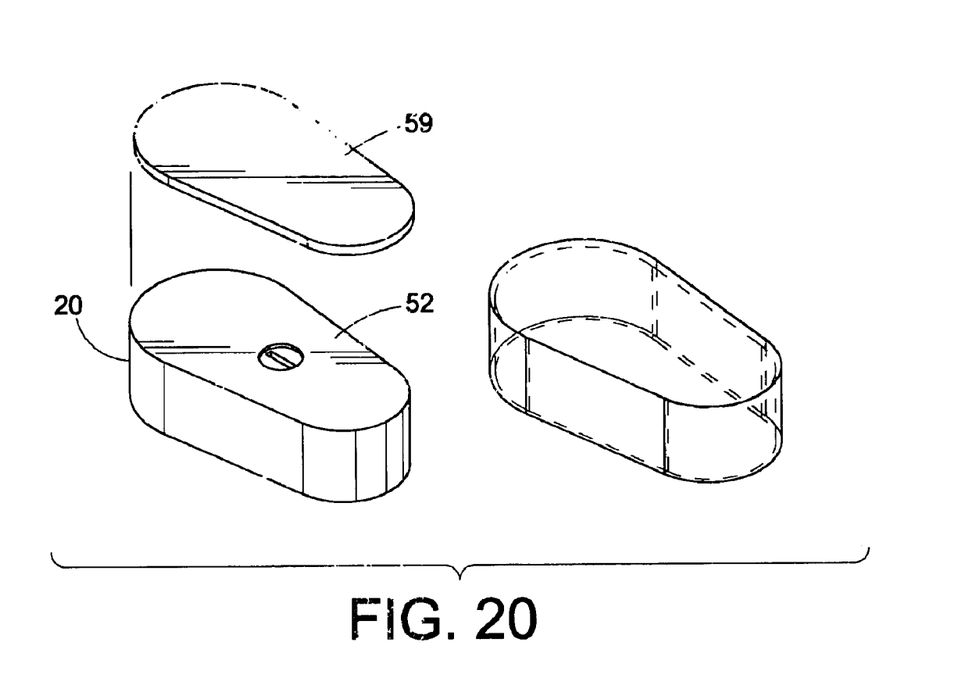
FIG. 20 illustrates a snap on cover for a threaded member lock.
Figure 21:
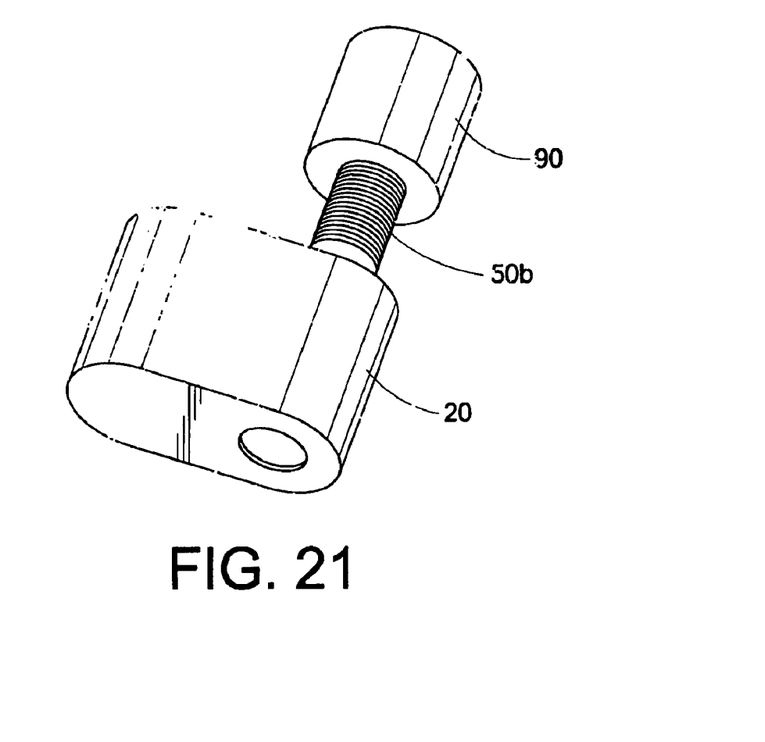
FIG. 21 illustrates an embodiment of a threaded member lock incorporating a threaded member end piece.

The lock body 20 is generally ovular with a top surface 52 and bottom surface 54 and a side surface 56 with a central cavity 57 for housing the locking components. The lock body 20 is made from a hardened metal, preferably to provide anti-saw protection. Optionally, the lock body 20 can include an environmental cover made from plastic or rubber. Furthermore, as shown in FIG. 20, the lock body 20 may further include a cap 59 that covers the top surface 52 of the lock body 20, thereby protecting the lock cylinder 30 from dirt, water, and general exposure to the environment. The lock body 20 or environmental cover 58 may optionally include gripping surfaces (not shown) on the side surface 56 of the lock body to facilitate gripping and turning of the lock 10. While the lock body 20 has been shown and described as ovular, it should be appreciated that the lock body 20 can take on a number of shapes, sizes, and configurations, such as, for example, the spherical lock body 20' shown in FIG. 17 in conjunction with the trailer ball lock. It should be appreciated that since the lock body 20 must be rotated by hand to operate the lock 10, as described further herein below, the general shape of the lock body 20 should preferably facilitate the gripping and turning of the lock body 20. For example, the lock 10 may be shaped like a valve handle, thereby providing finger gripping recesses. The bottom surface 54 of the lock body 20 includes a lower housing plate 60 which secures the locking components within the lock body 20. The lower housing plate 60 is preferably flat to allow for secure contact with the surface to which the lock 10 is applied. In another embodiment, the threaded member 50 includes a protruding shoulder to provide a tightening surface that is flush with the other threaded member once the lock 10 is tightened. It should be appreciated that the bottom surface 54 of the lock body 20 may be various forms and configurations, provided that a tightening surface is provided to secure the lock 10.

The lock cylinder 30 can be a variety to know lock cylinders, including, for example, a rotating lock cylinder or a push-button lock cylinder. The mechanics of the lock cylinder 30 are generally known in the art and therefore have not been included in this application in detail. The lock cylinder 30 receives a key, and the turning of the key triggers an interaction between the lock cylinder 30 and the engagement member 40. FIGS. 1–9 and 12–13 shows a rotating lock cylinder and FIGS. 10–11 and 14–16 show a push-button lock cylinder.

Figure 1:
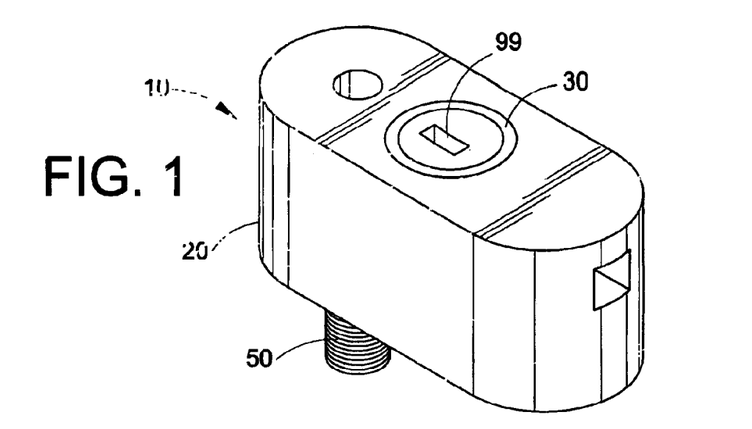
FIG. 1 is a perspective top view of a threaded member lock.
Figure 2:
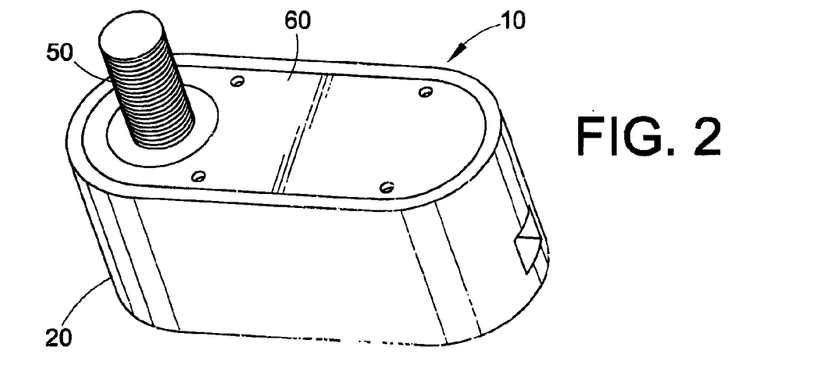
FIG. 2 is a perspective bottom view of a threaded member lock.
Figure 3:
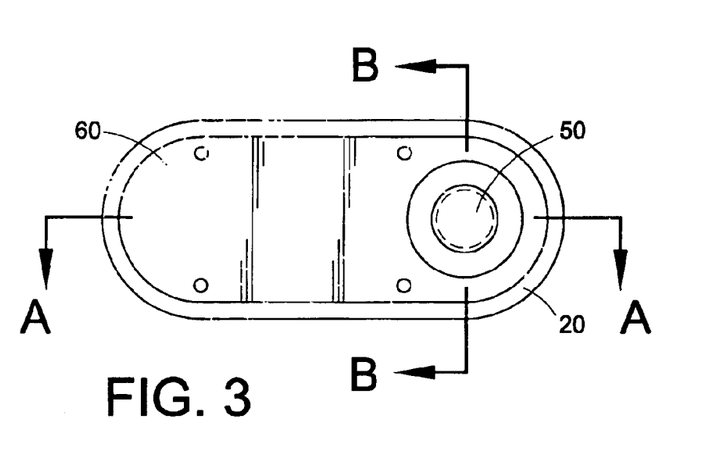
FIG. 3 is a bottom view of a threaded member lock.
Figure 4:
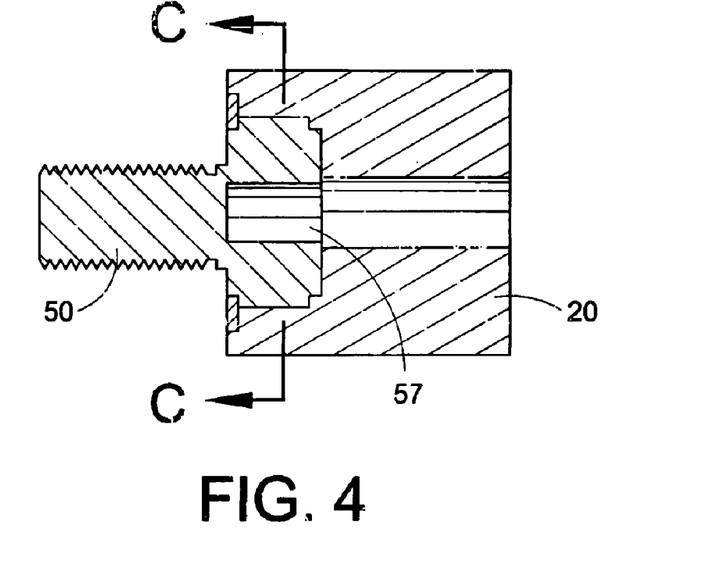
FIG. 4 is a cross-sectional view of the threaded member lock of FIG. 3 taken through B—B.
Figure 5:
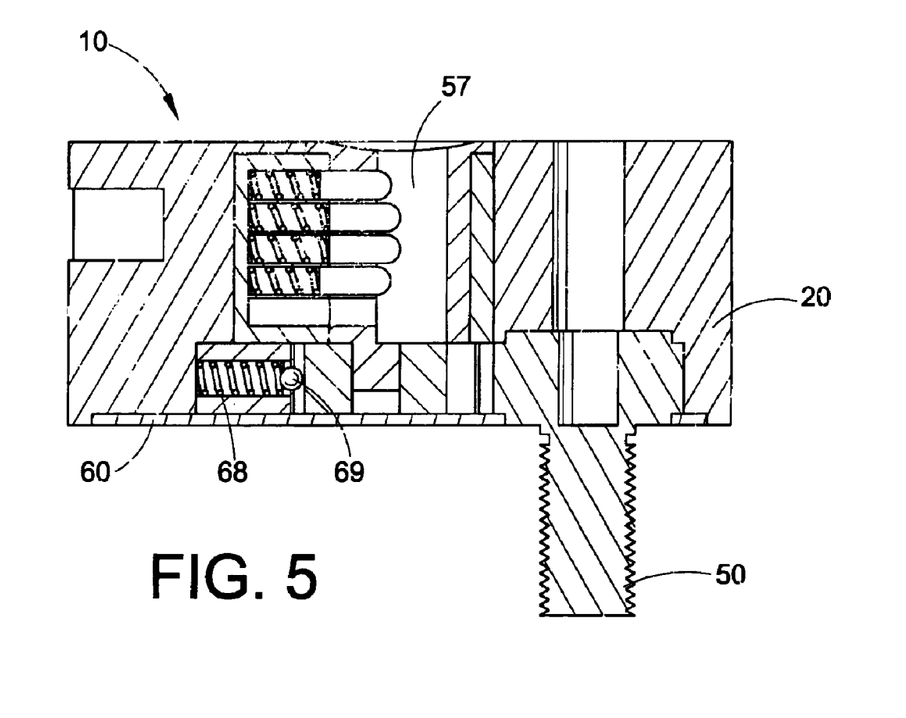
FIG. 5 is a cross-sectional view of the threaded member lock of FIG. 3 taken through A—A.
Figure 6:
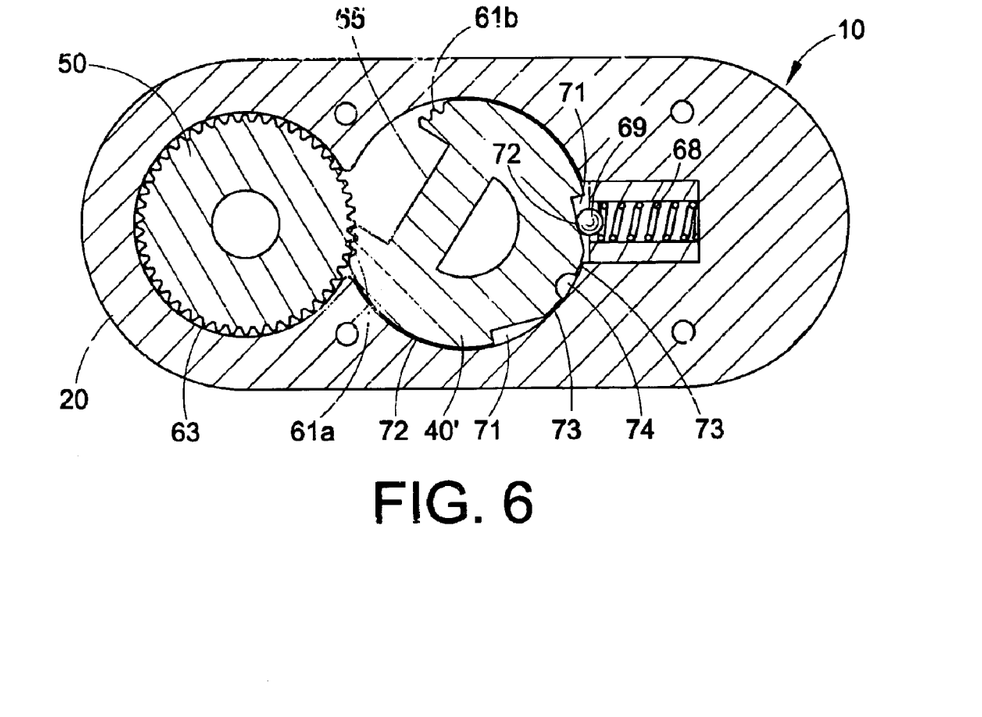
FIG. 6 is a cross-sectional view of the threaded member lock of FIG. 4 taken through C—C and shown in the unlocked position.
Figure 7:
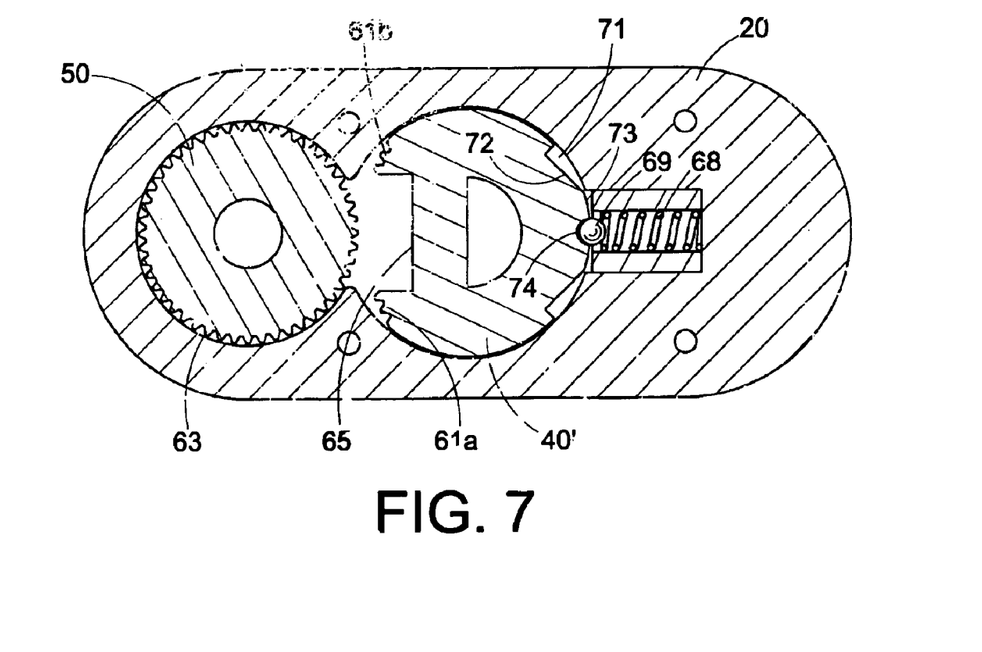
FIG. 7 is a cross-sectional view of the threaded member lock of FIG. 4 taken through C—C and shown in the locked position.
Figure 8:
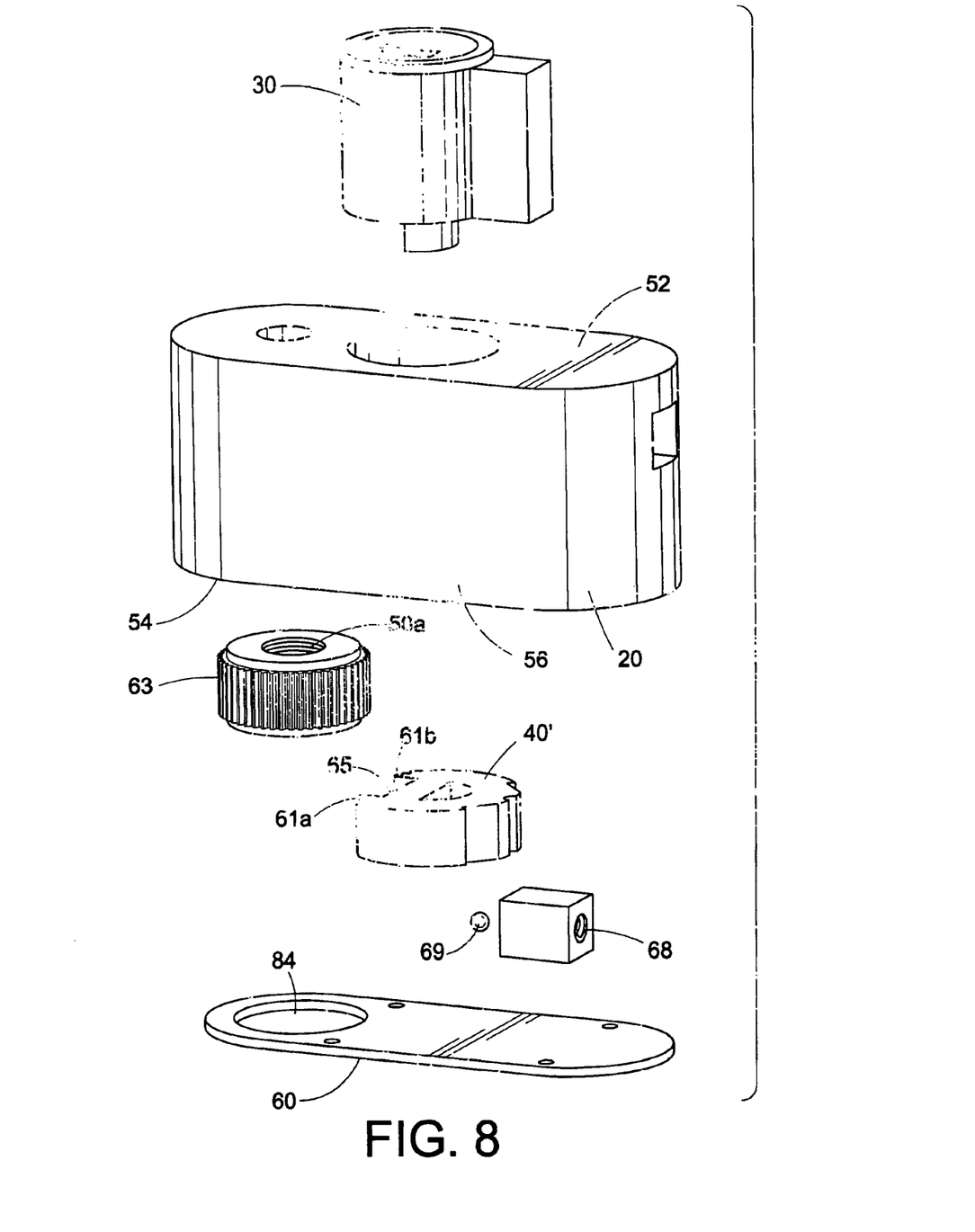
FIG. 8 is an exploded view of a threaded member lock incorporating a ratchet nut threaded member.
Figure 9:
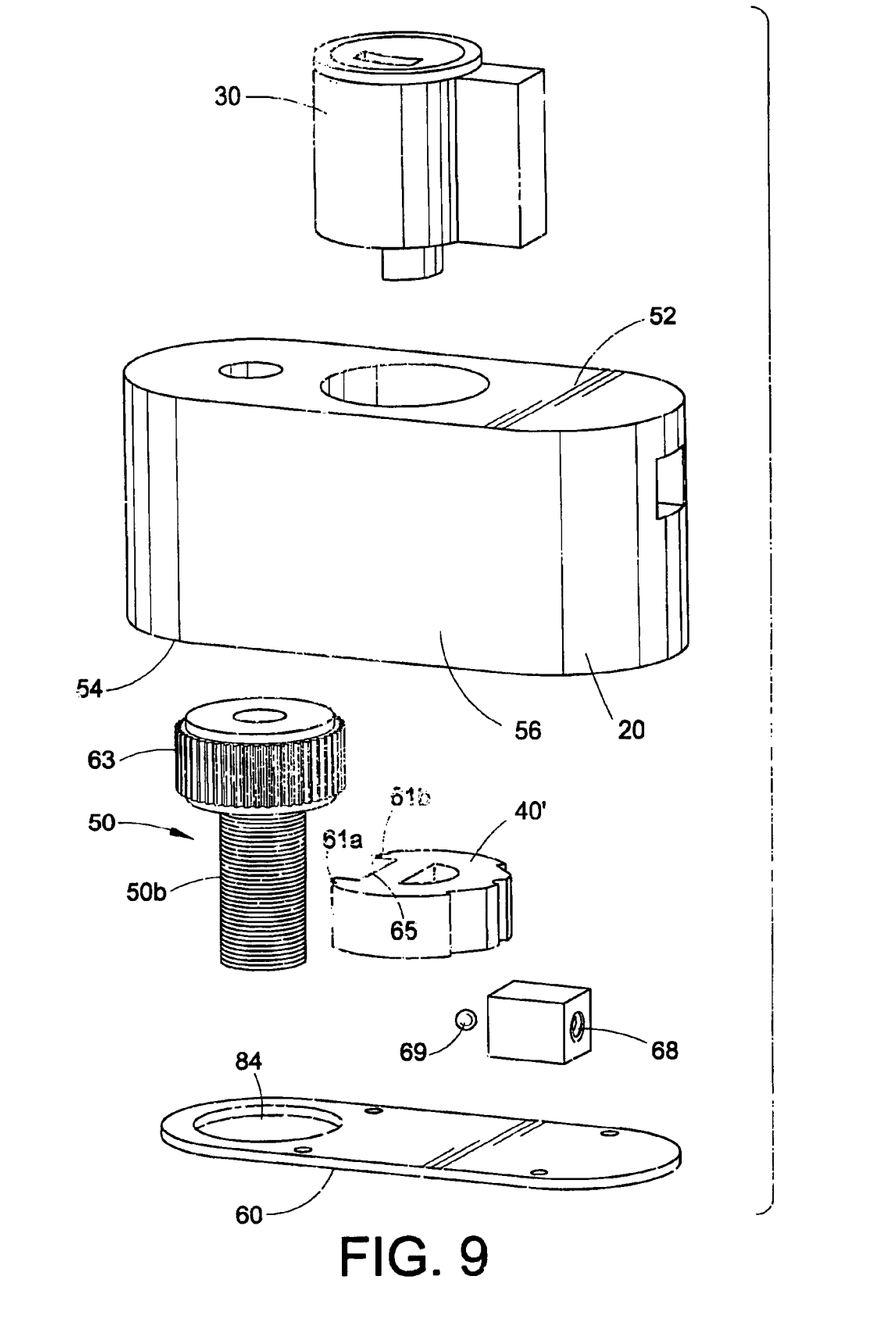
FIG. 9 is an exploded view of a threaded member lock incorporating a ratchet stud threaded member.
Figure 10A:
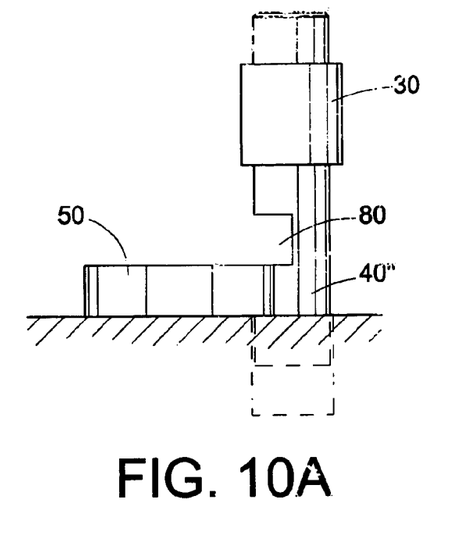
FIGS. 10A–B illustrate an embodiment of a threaded member lock incorporating a push-button lock cylinder with a vertically sliding locking lever with a disengagement recess in the unlocked position.
Figure 10B:
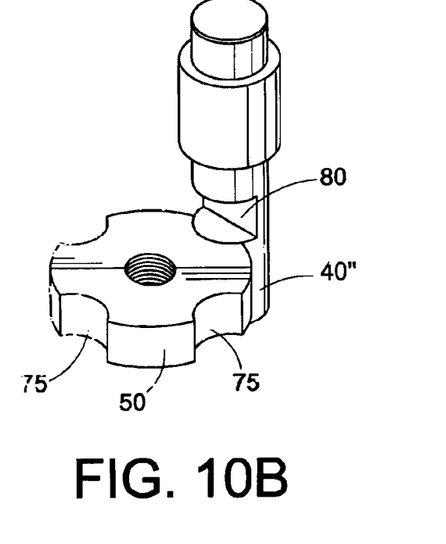
Figure 11A:
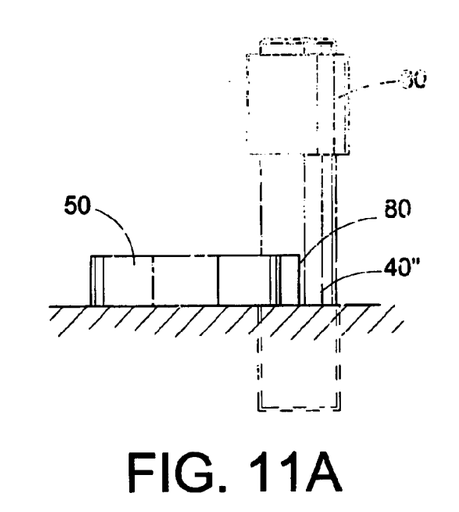
FIGS. 11A–B illustrate an embodiment of a threaded member lock incorporating a push-button lock cylinder with a vertically sliding locking lever with a disengagement recess in the locked position.
Figure 11B:
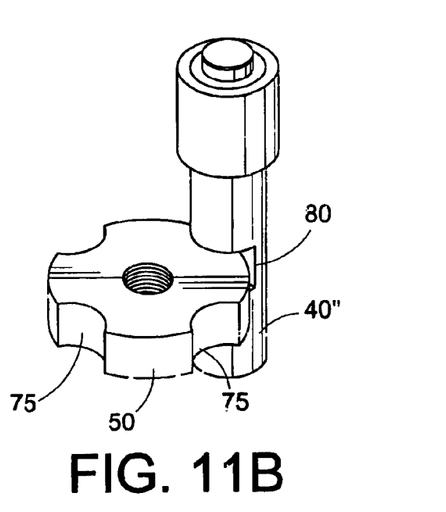
Figure 12:
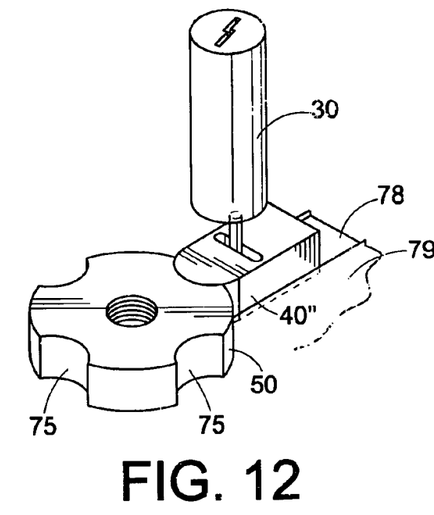
FIG. 12 illustrates an embodiment of a threaded member lock incorporating a rotating lock cylinder with a horizontally sliding locking lever in the unlocked position.
Figure 13:
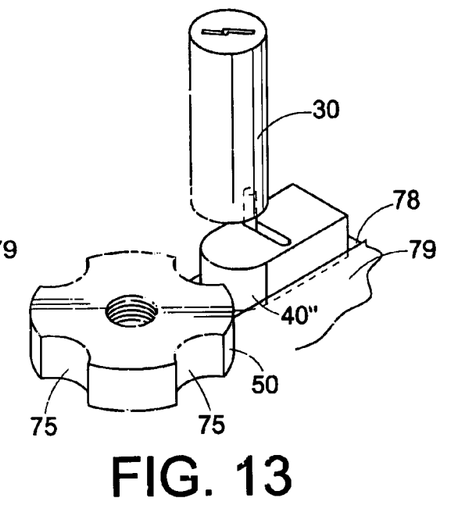
FIG. 13 illustrates an embodiment of a threaded member lock incorporating a rotating lock cylinder with a horizontally sliding locking lever in the locked position.
Figure 14:
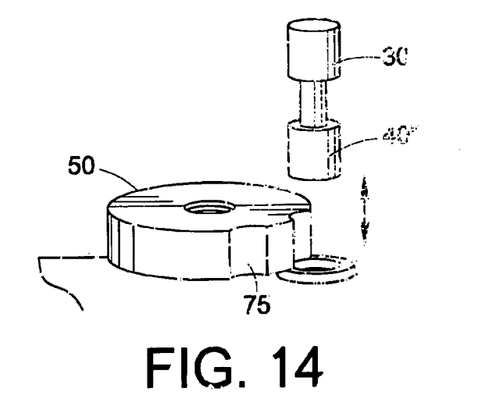
FIG. 14 illustrates an embodiment of a threaded member lock incorporating a push-button lock cylinder with a vertically sliding locking lever.
Figure 15:
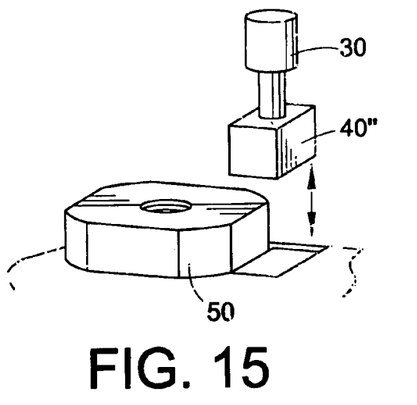
FIG. 15 illustrates an embodiment of a threaded member lock incorporating a push-button lock cylinder with a vertically sliding locking lever.
Figure 16:
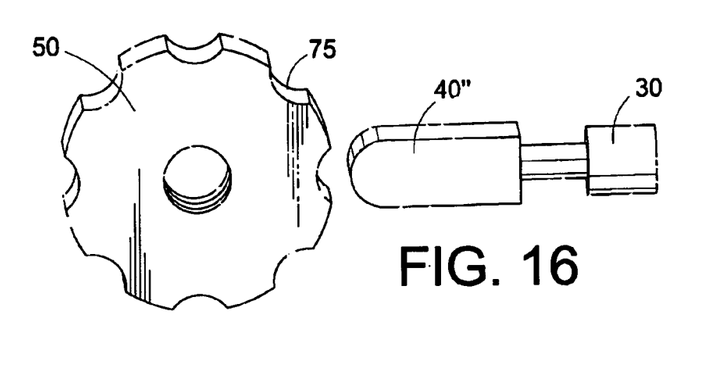
FIG. 16 illustrates an embodiment of a threaded member lock incorporating a push-button lock cylinder with a horizontally sliding locking lever.

In the embodiment shown in FIGS. 1–9, the turning of the lock cylinder 30 rotates a ratchet pawl 40' which acts as the engagement member 40 in this embodiment. The ratchet pawl 40' is rotated from a position of engagement with the threaded member 50 (as shown in FIG. 6), wherein the lock 10 is unlocked, to a position of disengagement with the threaded member 50 (as shown in FIG. 7), wherein the lock 10 is locked. The ratchet pawl 40' engages the threaded member 50 with a set of teeth 61 that interlock with a set of teeth 63 located on the periphery of the threaded member 50. Preferably, the teeth 61 and 63 are slightly angled to provide better engagement when moved to the locked position and easier disengagement when moved to the unlocked position. The ratchet pawl 40' has two sets of teeth 61, one set located on either side of a gap 65 in the ratchet pawl 40'. When the first set of teeth 61a engages the threaded member 50 the lock 10 can be tightened. This can be seen as a clockwise rotation of the lock 10 as shown in FIG. 6. When the second set of teeth 61b engage the threaded member 50 the lock can be loosened. When the gap 65 is aligned with the threaded member 50, as shown in FIG. 7, the lock 10 is locked, as discussed below. Furthermore, in this embodiment, a pawl spring 68 and ball detent 69 are used to control the movement of the ratchet pawl 40'. The spring-loaded ball detent 69 engages a recess 71 in the ratchet pawl 40' thereby allowing the ratchet pawl 40' to rotate in a first direction (clockwise as shown in FIG. 6), but not in the other direction. The ball dent 69 stops the ratchet pawl 40' from progressing in the first direction as it engages the edge 72 of recess 71. However, camming surface 73 allows the ball detent 69 to move along the periphery of the ratchet pawl 40' out of the recess 71, thereby enabling movement of the ratchet pawl 40' in a second direction. This allows the ratcheting of the lock 10 which may help in tightening or loosening of the lock 10, especially in tight places. The ratcheting mechanism also provides an ergonomic method of tightening or loosening the lock 10. The spring-loaded ball detent 69 also can engage a back recess 74 in the ratchet pawl 40' to hold the ratchet pawl 40' in the disengaged (or locked) position. In the disengaged (or locked) position, the lock 10 is permitted to spin freely, thereby prohibiting tightening (to the point of potential failure) or loosening of the threaded member 50, and thereby preventing removal of the lock 10.

In another embodiment that incorporates a ratchet pawl 40' as the engagement member 40, the engagement of the threaded member 50 by the ratchet pawl 40' in the tightening position, or position where the first set of teeth 61a engages the ratchet pawl 40', acts as the locked position of the lock 10, wherein the lock 10 can be tightened but not loosened and removed. The engagement of the threaded member 50 by the ratchet pawl in the loosening position, or position where the second set of teeth 61b engages the ratchet pawl 40', acts as the unlocked position wherein the lock 10 can be loosened to the point of removal from the object to which the lock 10 is applied.

In the embodiments shown in FIGS. 10–16, a locking lever 40" is used as the engagement member 40. In this embodiment, the teeth 63 located on the periphery of the threaded member 50 are replaced by one or more recesses 75. The locking lever 40" engages a recess 75 to allow the threaded member 50 to be driven to tighten or loosen the lock 10. When the locking lever 40" disengages the threaded member 50, the lock 10 is permitted to spin freely, thereby preventing the tightening or loosening of the threaded member 50. In the embodiments shown in FIGS. 12–13 and 16, the locking lever 40" is slid horizontally within the inner central cavity 57 of the lock body 20. Preferably, the locking lever 40" is guided and supported by a groove 78 along the inner surface 79 of the bottom surface 54 of the lock body 20. In the embodiment shown in FIGS. 10–11 and 14–15, the locking lever 40" is slid vertically within the inner central cavity 57 of the lock body 20. In the embodiment shown in FIGS. 10–11, a recess 80 is incorporated into the locking lever 40" to allow the disengagement of the threaded member 50 and provide a locked position for the lock 10.

Figures 18B, 18C:
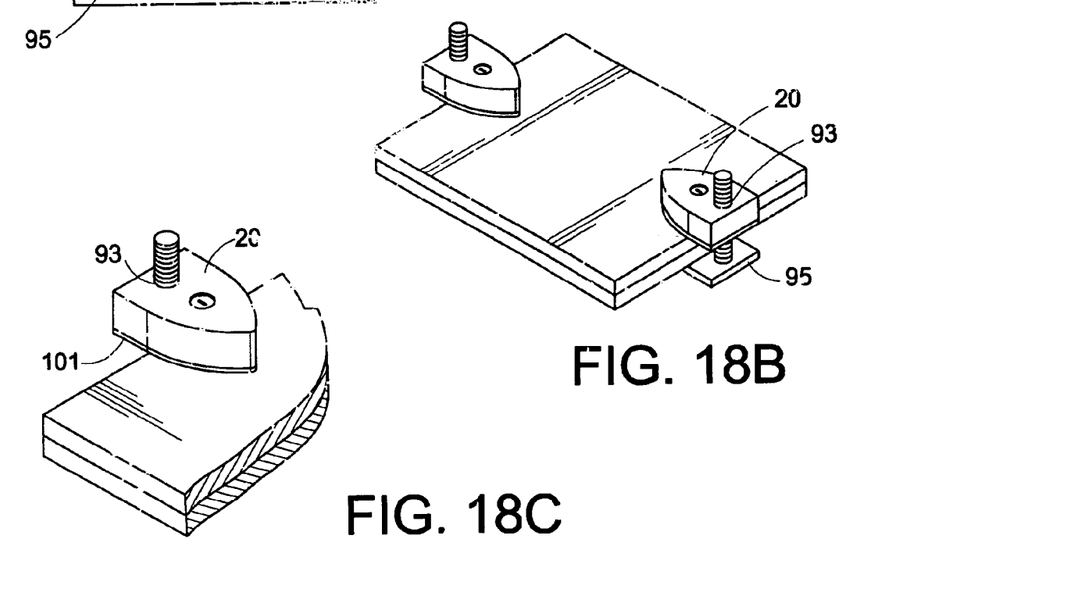
Figure 19A:
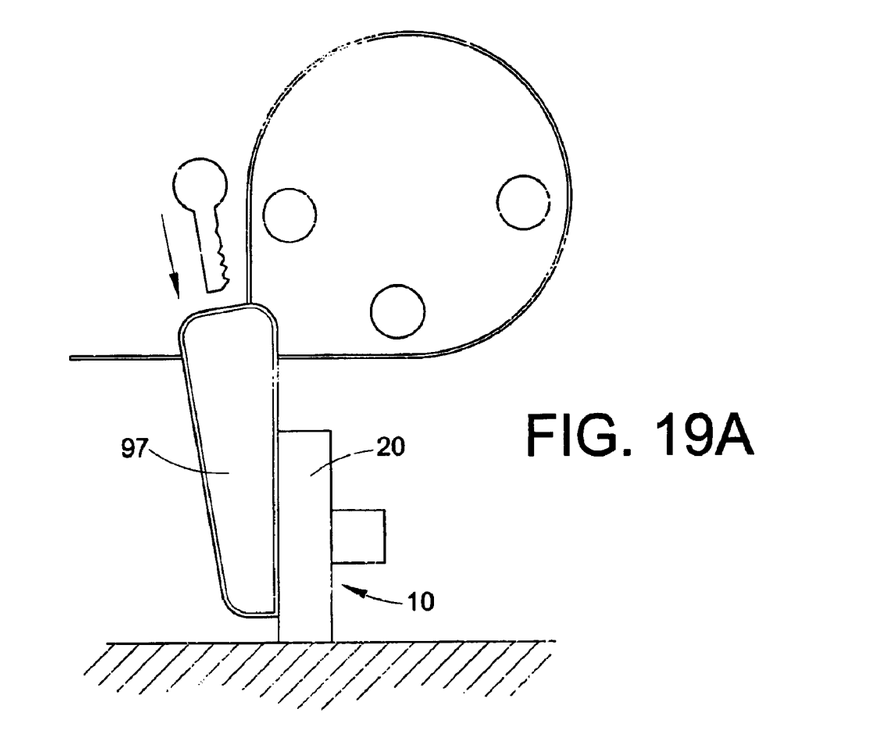
FIG. 19A illustrates an embodiment of a threaded member lock incorporating a cable lock assembly.
Figure 19B:
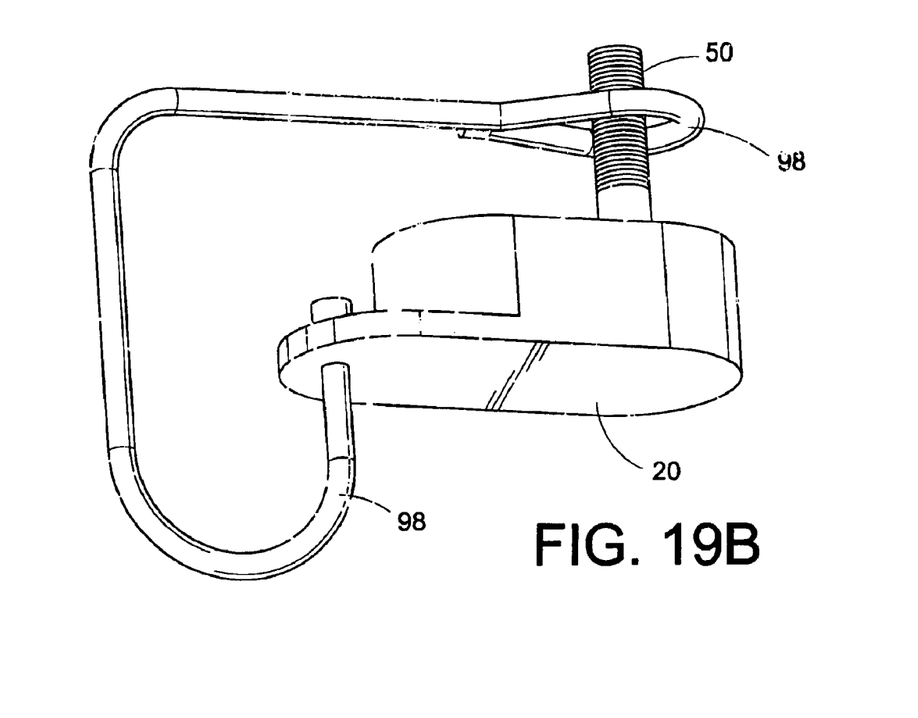
FIG. 19B illustrates an embodiment of a threaded member lock incorporating an integral cable member.

The threaded member 50 is disposed within the interior central cavity 57 of the lock body 20 and can access the threaded member of the object to be locked through a hole 84 in the lower housing plate 60. The threaded member 50 may be either a threaded nut 50a or a threaded stud 50b. The lock 10 may come in a variety of sizes to accommodate various sizes of mating thread members. Optionally, an adapter can be used to convert a threaded nut to a threaded stud, or to covert the lock 10 to accommodate different sizes of mating thread members. Additionally, for the threaded stud 50b embodiment of the lock 10, a corresponding lock receiving end piece 90 can be used to provide a set of mating threads for the lock 10. The end piece 90 may either have male or female threaded pieces so that the end piece 90 can mate with either the threaded nut 50a or threaded stud 50b embodiments of the lock 10. In other embodiments, such as the embodiment shown in FIGS. 18A–C and 19A–C, a through hole 93 is aligned with the threaded member 50 to allow a threaded stud member to pass through the lock body 20. The threaded member lock 10 can be combined with other features, such as the clamp assembly 95 shown in FIGS. 18A–C or the cable lock assembly 97 shown in FIG. 19A. Optionally, a cable 98 can be secured to the lock body 20 to provide additional security. The cable 98 is engaged with the object to be secured. Another feature that may be included into any one of the disclosed embodiments is a protective cushion 101 that can be attached to the bottom surface 54 of the lock body 20 to prevent scratching, or otherwise damaging, the surface of the object to which the lock 10 is applied.

As an illustrative example, the embodiment of the present invention which incorporates the ratchet pawl 40' with a rotating lock cylinder 30 (shown in FIGS. 1–9) will be used to illustrate the method of locking and unlocking the lock 10. It should be appreciated that other embodiments of the lock 10 operate in a similar manner, with the differences pointed out in the disclosure above. In order to lock the lock 10, a key (not shown) is inserted into the keyway 99 of the lock cylinder and rotated counterclockwise (as seen from the top of the lock). The key is used to move the lock cylinder 30 and, as shown in FIG. 6, rotate the ratchet pawl 40' clockwise such that the first set of teeth 61a engage the teeth 63 on the threaded member 50. The spring-loaded ball detent 72 secures the ratchet pawl 40' into position and prevents further clockwise rotation. The lock body 20 is then rotated clockwise to progress the threaded member 50 tighter onto the corresponding threaded member of the object to be locked. In this particular embodiment, the lock body 20 can be turned counterclockwise, while tightening the threaded member 50, to position the lock body 20 in a better or more convenient orientation for continued tightening. The ratchet pawl 40' can rotate in the counterclockwise direction as the ball dent 69 moves along camming surface 73, as discussed above. During this counterclockwise rotation of the lock body 20 the threaded member 50 does not progress in either direction, and thus a ratcheting technique can be used to tighten the lock 10. When the lock 10 has been tightened to the point desired, the key is turned and the lock cylinder 30 rotates the ratchet pawl 40' back to the centered position. So positioned, the gap 65 of the ratchet pawl 40' is aligned with the threaded member 50 and therefore the ratchet pawl 40' does not engage the threaded member 50. The ball detent 69 engages the back recess 74 of the ratchet pawl 40' keeping the ratchet pawl 40' in the disengaged position. The lock 10 is now secure as the lock body 20 is free to rotate without engaging the threaded member 50. To unlock the lock 10, the key is inserted into the keyway 99 of the lock cylinder 30 and rotated in the opposite direction. The second set of teeth 61b on the ratchet pawl 40' engage the teeth 63 of the threaded member 50. The lock body 20 can be turned counterclockwise, with a clockwise ratcheting motion, to progress the threaded member 50 and loosen the lock 10 to the point of removal from the object to which the lock is applied.

As shown in Appendix A, the entire disclosure of which is hereby incorporated by reference, there are a number of uses for the lock 10, including, for example, automotive, sports and recreation, computers and electronics, marine, industrial and home uses. As shown, the various embodiments of the lock 10 have minor alterations in the size, shape and configuration of the lock 10 to allow for easier use of the lock 10. It should be appreciated that these alterations are within the scope of the claimed invention.

What is claimed is:

1. A lock for securing a threaded connection comprising:
   a lock body;
   a lock cylinder disposed within said lock body;
   a lock threaded member at least partially disposed within said lock body; and
   an engagement member which interacts with said lock cylinder to move within the lock body to engage the look threaded member in at least two different positions, wherein one of the positions allows the lock member to be tightened onto the threaded connection and wherein another of the positions allows the lock threaded member to be loosened from the threaded connection.

2. The lock of claim 1, wherein the lock includes an engagement member position wherein the lock threaded member is disengaged, thereby providing a locked position for the lock.

3. The lock of claim 1, wherein the threaded connection is located on an object to which the lock is applied.

4. The lock of claim 1, wherein the threaded connection is located on another part of the lock.

5. The lock of claim 1, wherein said lock threaded member is a threaded stud member.

6. The lock of claim 1, wherein said lock threaded member is a nut member.

7. The lock of claim 1, wherein said engagement member includes at least two sets of teeth that engage said threaded member.

8. The lock of claim 1 further comprising a spring-loaded ball detent, wherein said spring-loaded ball detent engages said engagement member.

9. The lock of claim 8, wherein said spring-loaded ball detent engages said engagement member to secure the engagement member in a position wherein said engagement member disengages from the locking tread member.

10. The lock of claim 1 further comprising an environmental covering that fits over the lock body.

11. The lock of claim 1 further comprising a protective cap.

12. The lock of claim 1 further comprising a through hole through the lock body and aligned with the lock threaded member to allow said threaded member to pass therethrough.

13. The lock of claim 1, wherein said locking cylinder is a rotating lock cylinder.

14. The lock of claim 1, wherein said locking cylinder is a push-button lock cylinder.

15. The lock of claim 1 further comprising an integral cable that is secured by said lock threaded member.

16. The lock of claim 1 further comprising a cable that is secured to the lock body.

17. The lock of claim 1 further comprising a clamp assembly, wherein an object is secured between the locking and abase of the clamp.

18. The lock of claim 1 further comprising a cushion located on at least one surface of said lock body.

19. A lock comprising:
   a lock body;
   a lock cylinder disposed within said lock body;
   a first threaded member at least partially disposed within said lock body and engageable by a second threaded member, said first threaded member having a central axis and a cut-out blocking surface along a periphery of said first threaded member;
   an engagement member which interacts with said lock cylinder to move within the lock body to selectively engage said first threaded member along said cut-out blocking surface; and wherein said lock is in a locked position when said engagement member engages said first threaded member and is in an unlocked position when said engagement member disengages said first threaded member.

20. A method of locking an object including a threaded connection comprising the steps of:
rotating a lock cylinder from a first position to a second position;
engaging a locking threaded member with an engagement mechanism which is moved by said lock cylinder;
rotating a lock body in a first direction and thereby tightening said locking threaded member onto the threaded connection; and
rotating the lock cylinder back to said first position and thereby allowing the lock to be removed from the threaded connection;
wherein the step of the lock body in a second direction while the engagement mechanism is engaged with said locking threaded member to provide a ratcheting mechanism.

21. The method of claim 20, wherein the step of rotating the lock cylinder back to said first position further comprises the step of disengaging said engagement member from engagement with said lock threaded member.

22. A lock comprising:
a lock body;
a lock cylinder disposed within said lock body;
a first threaded member at least partially disposed within said lock body and engageable by a second threaded member;
an engagement mechanism engaged by said lock cylinder and selectively engageable with said first threaded member; wherein said engagement member is a generally cylindrical member formed with at least two toothed regions on either side of a recessed region; wherein one of said toothed regions engages said first threaded member in a first engagement mechanism position for tightening the first threaded member onto the second threaded member, the other of said toothed regions engages said first threaded member in a second engagement mechanism position for loosening the first threaded member from the second threaded member, and wherein said recess aligns with said first threaded member in a third engagement mechanism position such as to disengage said engagement member from said fist threaded member, thereby locking the lock.

23. The lock of claim 22, wherein said first and second engagement mechanism positions provide for ratcheting the lock when rotated in the opposite direction as tightening and loosening, respectively.

24. A lock for securing a threaded connection comprising
a lock body;
a lock cylinder disposed within said lock body;
a lock threaded member at least partially disposed within said lock body; and
en engagement member which interacts with said lock cylinder to move within the lock body to engage the lock threaded member in at least two different positions, including a first position, wherein rotation of said engagement member in a first direction tightens said lock threaded member and rotation of said engagement member in a second direction ratchets the lock, and a second position wherein rotation of the engagement member in said second direction loosens said lock threaded member and rotation of said engagement member in said first direction ratchets the lock.

25. A lock for securing a threaded connection comprising:
a lock body;
a lock cylinder disposed with said lock body;
a lock threaded member at least partially disposed within said lock body and having a blocking surface disposed within said lock body;
an engagement member which interacts with said lock cylinder to move within the lock body to engage and disengage the lock threaded member; wherein said engagement member includes a blocking surface having a central axis that is parallel and space apart from said lock threaded member blocking surface;
wherein said lock is in a locked position when said engagement member engages said lock threaded member and is in an unlocked position when said engagement member disengages said lock threaded member.

26. The lock of claim 25 wherein said lock threaded member blocking surface comprises one or more cut-out sections.

* * * * *